US008483272B2

(12) United States Patent
Brailovskiy

(10) Patent No.: US 8,483,272 B2
(45) Date of Patent: Jul. 9, 2013

(54) SYSTEM AND METHOD FOR FRAME LEVEL BIT RATE CONTROL WITHOUT PRE-ANALYSIS

(75) Inventor: Ilya Brailovskiy, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 336 days.

(21) Appl. No.: 12/889,635

(22) Filed: Sep. 24, 2010

(65) Prior Publication Data

US 2012/0076202 A1  Mar. 29, 2012

(51) Int. Cl.
 *H04N 11/02* (2006.01)
(52) U.S. Cl.
 USPC .............................. 375/240.03; 375/240.23
(58) Field of Classification Search
 USPC ...................................... 375/240.03
 See application file for complete search history.

(56) References Cited

U.S. PATENT DOCUMENTS

| | | | | |
|---|---|---|---|---|
| 5,745,178 A * | 4/1998 | Hartung et al. | ......... | 375/240.04 |
| 5,758,092 A * | 5/1998 | Agarwal | ................. | 709/247 |
| 5,805,220 A * | 9/1998 | Keesman et al. | ....... | 375/240.01 |
| 6,215,820 B1 * | 4/2001 | Bagni et al. | ................ | 375/240 |
| 6,438,168 B2 * | 8/2002 | Arye | ................... | 375/240.03 |
| 6,507,616 B1 * | 1/2003 | Ryu | ..................... | 375/240.13 |
| 6,570,921 B1 * | 5/2003 | Bailleul et al. | ........... | 375/240.07 |
| 6,587,508 B1 * | 7/2003 | Hanamura et al. | ...... | 375/240.24 |
| 6,654,421 B2 * | 11/2003 | Hanamura et al. | ...... | 375/240.26 |
| 6,688,714 B1 * | 2/2004 | Bailleul et al. | ........... | 375/240.23 |
| 6,944,224 B2 * | 9/2005 | Zhao et al. | ............... | 375/240.16 |
| 7,209,519 B2 * | 4/2007 | Vetro et al. | ............... | 375/240.03 |
| 7,409,097 B2 * | 8/2008 | Zhang et al. | ............... | 382/239 |
| 7,630,435 B2 * | 12/2009 | Chen et al. | ............... | 375/240.03 |
| 7,653,253 B2 * | 1/2010 | Fujisawa et al. | ............. | 382/233 |
| 7,864,840 B2 * | 1/2011 | Labrozzi et al. | ........ | 375/240.03 |
| 8,085,679 B2 * | 12/2011 | Lee | ................ | 370/252 |
| 2001/0000138 A1 * | 4/2001 | Bailleul | ........................ | 370/527 |
| 2006/0104360 A1 * | 5/2006 | Gordon | ................... | 375/240.16 |
| 2007/0071094 A1 * | 3/2007 | Takeda et al. | ............ | 375/240.04 |
| 2008/0063052 A1 * | 3/2008 | Lin | .......................... | 375/240.03 |
| 2008/0151998 A1 * | 6/2008 | He | ............................. | 375/240.03 |
| 2009/0022218 A1 * | 1/2009 | Kim et al. | ................ | 375/240.03 |
| 2010/0104017 A1 * | 4/2010 | Faerber et al. | ........... | 375/240.16 |
| 2011/0292998 A1 * | 12/2011 | Ohgose et al. | ........... | 375/240.08 |
| 2012/0093219 A1 * | 4/2012 | Varghese | ................. | 375/240.03 |

OTHER PUBLICATIONS

Mehdi Rezaei et al., Semi-Fuzzy Rate Controller for Variable Bit Rate Video, May 2008, IEEE, Transactions on Circuits and Systems for Video Technology, vol. 18, No. 5, pp. 635.*

(Continued)

*Primary Examiner* — Sath V Perungavoor
*Assistant Examiner* — Peter D Le
(74) *Attorney, Agent, or Firm* — Garrett IP, LLC

(57) ABSTRACT

Methods and systems to determine a quantization parameter (QP) that may then be used in a bit rate control process during video compression and decompression. The QP for a frame may be derived by determining an initial QP, adapting this value, and applying a final control calculation. The QP for a frame may be calculated from a variety of variables, that may include the frame type (intracoded (I), predictive (P), or bipredictive (B)), the fullness of a hypothetical reference decoder (HRD) buffer, the instant and target bit rates, a total encode size, a total target size, the number of P frames between I frames in a group of pictures (GOP), the number of B frames between I frames in the GOP, and the size of previous frames.

8 Claims, 9 Drawing Sheets

OTHER PUBLICATIONS

Bagni, et al., "A Constant-Quality, Single-Pass VBR Control for DVD Recorders," IEEE International Conference on Consumer Electronics, Jun. 17-19, 2003. pp. 108-109.

Mehdi, et al., "Semi-Fuzzy Rate Controller for Variable Bit Rate Video," IEEE Transactions on Circuits and systems for video technology, vol. 18, No. 5, May 2008, pp. 633-645.

* cited by examiner

SYSTEM AND METHOD FOR FRAME LEVEL BIT RATE CONTROL WITHOUT PRE-ANALYSIS

BACKGROUND

The transmission and storage of digitized video may require considerable bandwidth. The bandwidth requirements may be such that video cannot be transmitted in real time, for example, resulting in a poor user experience.

One way in which this problem may be addressed is through the compression of a video signal. This results in fewer bits per frame having to be transmitted, and therefore allows the transmission of a greater number of frames per unit time given a channel of limited capacity. There are several disadvantages that may come with video compression, however. One disadvantage is that the quality of the video received may be poor. Compression may result in less information being transmitted. The result is that the image, as reconstructed for the user, may be inferior.

As a result, there is an historical trade-off between video quality and the extent of video compression applied to a signal. Greater compression lowers the bandwidth requirement and allows a lower bit rate, but may result in a poor experience for the user. Less compression requires more bandwidth and a higher bit rate, but the user's viewing experience may be better.

The extent of video compression may be controlled by a bit rate control algorithm. Such an algorithm affects the amount of compression performed and therefore affects the trade-off between bandwidth consumption and video quality. Typically, a quantization parameter (QP) drives the extent of video compression in a bit rate control algorithm.

BRIEF DESCRIPTION OF THE DRAWINGS/FIGURES

Figure 1:
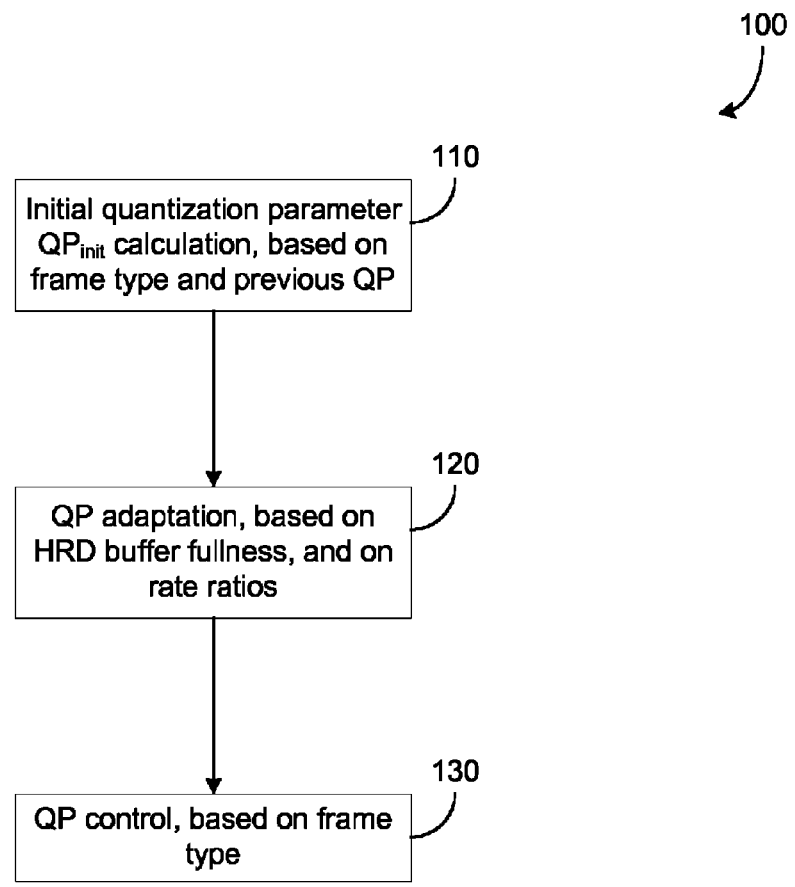
FIG. 1 is a flowchart illustrating the overall processing of an embodiment.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems to determine a quantization parameter (QP) that may then be used in a bit rate control process during video compression. The QP for a frame may be derived by determining an initial QP, adapting this value and, in an embodiment, applying a final control process. The QP for a frame may be determined from a variety of variables; these may include the frame type (intracoded (I), predictive (P), or bipredictive (B)), the fullness of a hypothetical reference decoder (HRD) buffer, the instant and target bit rates, a total encode size, a total target size, the number of P frames between I frames in a group of pictures (GOP), the number of B frames between I frames in the GOP, and the size of previous frames.

An embodiment of the overall process is illustrated in FIG. 1. At 110, and initial quantization parameter QP$_{init}$ may be calculated for a frame, based on the frame type and the previous quantization parameter. At 120, and adaptation of QP$_{init}$ may be performed to create a value QP$_{adapt}$, based on HRD buffer fullness and on rate ratios that will be described in greater detail below. At 130, a final quantization parameter QP$_{final}$ final may be derived by applying a control process to QP$_{adapt}$.

Figure 2:
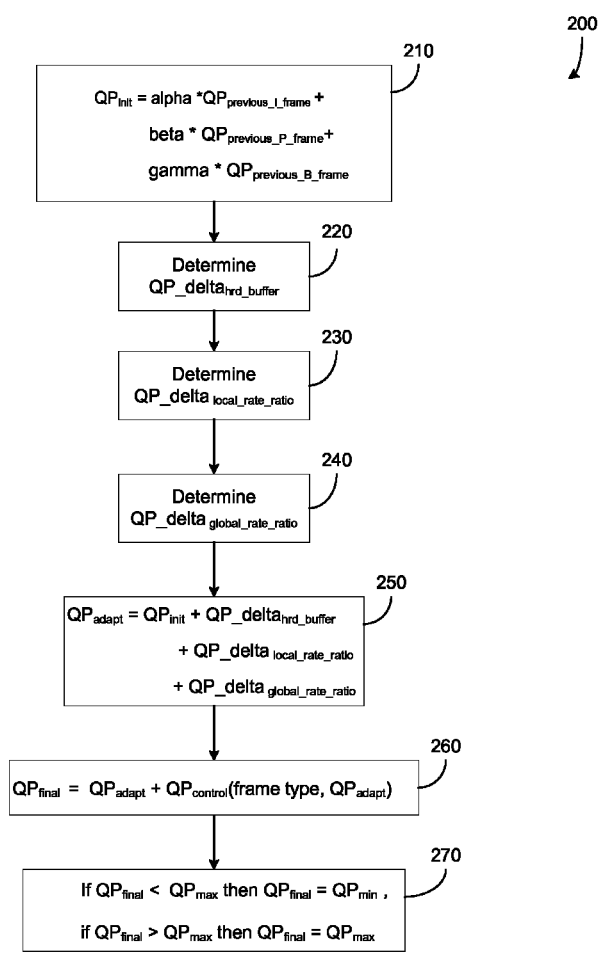
FIG. 2 is a flowchart illustrating the processing of a frame encoded according to the Advanced Video Coding standard (AVC), according to an embodiment.

An embodiment of the process as performed for a frame encoded according to the Advanced Video Coding standard (AVC) is illustrated in FIG. 2. At 210, QP$_{init}$ may be determined as a sum of terms, $$QP_{init} = \text{alpha} * QP_{previous\_I\_frame} + \text{beta} * QP_{previous\_P\_frame} + \text{gamma} * QP_{previous\_B\_frame}$$

Here, the values QP$_{previous\_I\_frame}$, QP$_{previous\_P\_frame}$, and QP$_{previous\_B\_frame}$ refer to quantization parameters for the previous I, P, and B frames respectively. The coefficients alpha, beta, and gamma may have the properties that each is greater than or equal to 0, and they collectively sum to 1.

In the illustrated embodiment, the QP adaptation 120 is shown as sequence 220-250. At 220, a value QP_delta$_{hrd\_buffer}$ may be determined. This represents a value that may be added to QP$_{init}$, and that depends on the fullness of the HRD buffer. For greater fullness of this buffer, QP$_{init}$ may be increased by applying a higher value of QP_delta$_{hrd\_buffer}$. Given less fullness, QP_delta$_{hrd\_buffer}$ may be given a lesser value, or even a negative value.

At 230, a value for QP_delta$_{local\_rate\_ratio}$ may be determined. This value depends on a local rate ratio, which is the ratio of the instant bit rate (calculated in a manner to be described below, according to an embodiment) to a target bit rate. For higher local rate ratios, the value for QP_delta$_{local\_rate\_ratio}$ may be greater; for lower local rate ratios, the value for QP_delta$_{local\_rate\_ratio}$ may be lower.

Note however that, if fullness of the HRD buffer is high and the local rate ratio is high, their combined effect on QP$_{init}$ may be minimal. Likewise, if fullness of the HRD buffer is low and the local rate ratio is low, their combined effect on QP$_{init}$ may be minimal.

At 240, a value for QP_delta$_{global\_rate\_ratio}$ may be determined. This value depends on a global rate ratio, which is the ratio of a total encode size to a total target size. For higher global rate ratios, the value for QP_delta$_{global\_rate\_ratio}$ may be greater; for lower global rate ratios, the value for QP_delta$_{global\_rate\_ratio}$ may be lower.

At 250, $QP_{adapt}$ may be calculated as the sum $$QP_{adapt} = QP_{init} + QP\_delta_{hrd\_buffer} + QP\_delta_{local\_rate\_ratio} + QP\_delta_{global\_rate\_ratio}$$

In the illustrated embodiment, the determination of $QP_{control}$ is shown as the sequence 260-270. At 260, $QP_{final}$ may be calculated as the sum of $QP_{adapt}$ and a value $QP_{control}$ (frame type, $QP_{adapt}$). In an embodiment, this latter value may be a relatively small value, between −1 and +1, that may be added to $QP_{adapt}$ if the frame is a reference frame. This serves to make the weight of a reference frame greater with respect to non-reference frames. Generally, higher values for $QP_{control}$ (frame type, $QP_{adapt}$) may be used for higher bit rates. The appropriate value for $QP_{control}$ (frame type, $QP_{adapt}$) may be decided empirically in an embodiment.

At 270, a clipping process may be performed in an embodiment. Here, if $QP_{final}$ is less than $QP_{max}$ then $QP_{final}$ may be set to $QP_{min}$. If $QP_{final}$ is greater than $QP_{max}$ then $QP_{final}$ may be set to $QP_{max}$. $QP_{final}$ may be unchanged otherwise. In an embodiment, the values for $QP_{max}$ and $QP_{min}$ may be supplied by the user.

Figure 3:
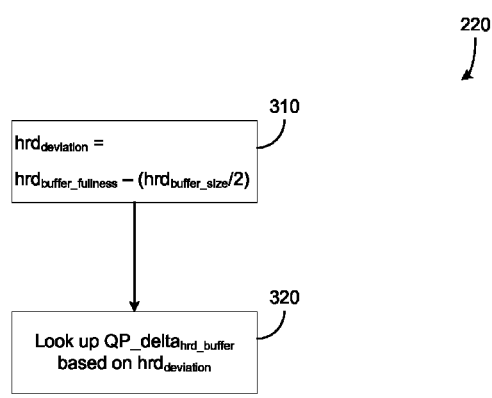
FIG. 3 is a flowchart illustrating the determination of QP_delta$_{hrd\_buffer}$, according to an embodiment.

FIG. 3 illustrates the determination of $QP\_delta_{hrd\_buffer}$ (220 of FIG. 2) in greater detail, according to an embodiment. At 310, a value $hrd_{deviation}$ may be calculated according to the equation $$hrd_{deviation} = hrd_{buffer\_fullness} - (hrd_{buffer\_size}/2)$$

where $hrd_{deviation}$ refers to the amount of memory currently used in the HRD buffer, and $hrd_{buffer\_size}$ refers to the size of this buffer. At 320, a value for $QP\_delta_{hrd\_buffer}$ is determined on the basis of $hrd_{deviation}$. In an embodiment, $QP\_delta_{hrd\_buffer}$ may be looked up in a lookup table. As discussed above, given less fullness, $QP\_delta_{hrd\_buffer}$ is given a lesser value, or even a negative value, but may be given a larger value if fullness of the HRD buffer is greater. $QP\_delta_{hrd\_buffer}$ may therefore depend on the extent of fullness of this buffer. The lookup table may be generated empirically in an embodiment, and may depend on the particular system and configuration in which this process is used.

Figure 4:
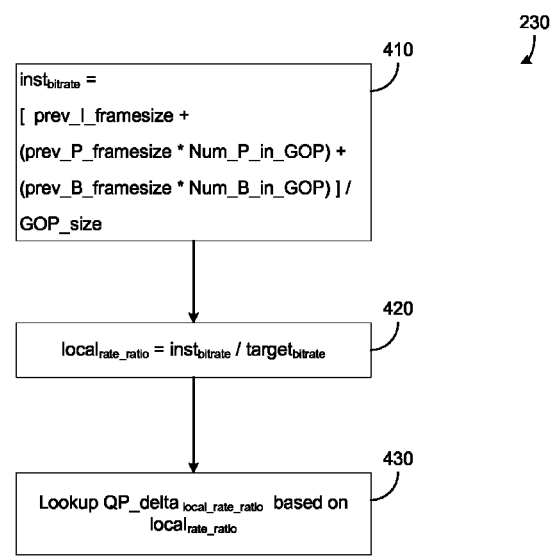
FIG. 4 is a flowchart illustrating the determination of QP_delta$_{local\_rate\_ratio}$, according to an embodiment.

FIG. 4 illustrates the determination of $QP\_delta_{local\_rate\_ratio}$ (230 of FIG. 2) in greater detail, according to an embodiment. At 410, the current bit rate, $inst_{bitrate}$, may be calculated. In the illustrated embodiment, this may be calculated according to the equation $$inst_{bitrate} = [prev\_I\_framesize + (prev\_P\_framesize * Num\_P\_in\_GOP) + (prev\_B\_framesize * Num\_B\_in\_GOP)]/GOP\_size.$$

Here, prev_I_framesize refers to the size of the previous I frame, prev_B_framesize refers to the size of the previous B frame, and prev_P_framesize refers to the size of the previous P frame. GOP refers to a group of pictures between two I frames. Num_P_in_GOP refers to the number of P frames in the GOP, while Num_B_in_GOP refers to the number of B frames in the GOP. GOP_size refers to the number of frames in the GOP.

At 420, the local rate ratio ($local_{rate\_ratio}$) may be determined as $inst_{bitrate}$ divided by a target bit rate ($target_{bitrate}$). At 430, a value for $QP\_delta_{local\_rate\_ratio}$ may be determined on the basis of $local_{rate\_ratio}$. In an embodiment, this determination may be performed using a lookup table. This table may be structured such that for higher local rate ratios, the value for $QP\_delta_{local\_rate\_ratio}$ may be greater; for lower local rate ratios, the value for $QP\_delta_{local\_rate\_ratio}$ may be lower, or even negative. The lookup table may be derived empirically in an embodiment, and may depend on the system in which this process is used, and the configuration of this system.

Figure 5:
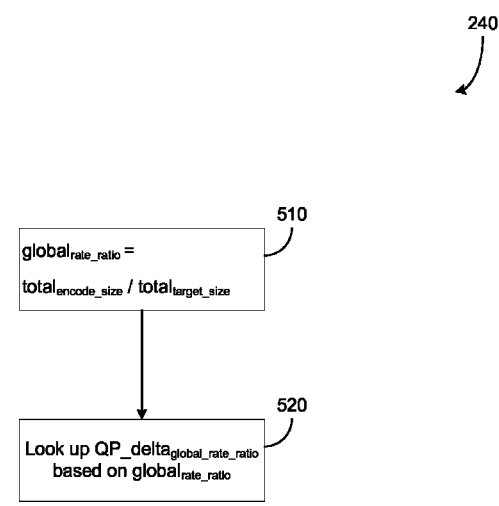
FIG. 5 is a flowchart illustrating the determination of QP_delta$_{global\_rate\_ratio}$, according to an embodiment.

FIG. 5 illustrates the determination of $QP\_delta_{global\_rate\_ratio}$ according to an embodiment. At 510, $global_{rate\_ratio}$ may be calculated as a ratio of a $total_{encode\_size}$ to a $total_{target\_size}$. At 520, the value of this ratio may be used in a lookup table to determine a corresponding value for $QP\_delta_{global\_rate\_ratio}$. This table may be derived empirically in an embodiment, and may depend on the system in which this process is used, and the configuration of this system.

As discussed above with respect to FIG. 2, the value for $QP\_delta_{global\_rate\_ratio}$ may then be used along with the values for $QP\_delta_{hrd\_buffer}$ and $QP\_delta_{local\_rate\_ratio}$ to determine $QP_{adapt}$.

Figure 6:
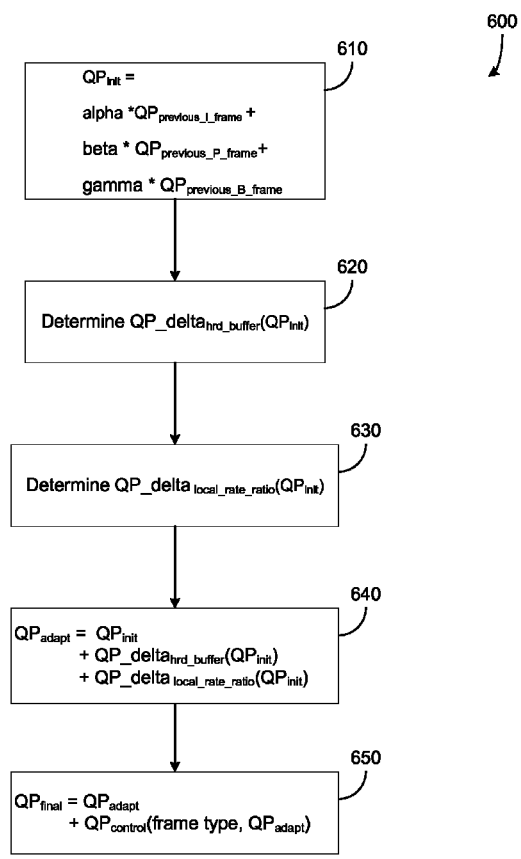
FIG. 6 is a flowchart illustrating the processing of a frame encoded according to the MPEG2 standard, according to an embodiment.

FIGS. 2-5 relate to the case of controlling bit rate for frames coded according to the AVC standard, according to an embodiment. FIG. 6 illustrates an embodiment of for controlling the bit rate for frames that are encoded according to the MPEG2 standard. At 610, $QP_{init}$ may be determined as a sum of terms, $$QP_{init} = alpha * QP_{previous\_I\_frame} + beta * QP_{previous\_P\_frame} + gamma * QP_{previous\_B\_frame}$$

Here, the values $QP_{previous\_I\_frame}$, $QP_{previous\_P\_frame}$, and $QP_{previous\_B\_frame}$ refer to quantization parameters for the previous I, P, and B frames respectively. The coefficients alpha, beta, and gamma may have the properties that each is greater than or equal to 0, and they collectively sum to 1.

The sequence 620-640 corresponds to QP adaptation 120 of FIG. 1. At 620, a value $QP\_delta_{hrd\_buffer}(QP_{init})$ may be determined, in a manner to be described in greater detail below. At 630, a value $QP\_delta_{local\_rate\_ratio}(QP_{init})$ may be determined. The determination of this value is also discussed below. At 640, $QP_{adapt}$ may be calculated as the sum $$QP_{adapt} = QP_{init} + QP\_delta_{hrd\_buffer}(QP_{init}) + QP\_delta_{local\_rate\_ratio}(QP_{init}).$$

In an embodiment, the value by which $QP_{init}$ is modified may also depend on the previous value of QP. In such an embodiment, if the previous QP is higher, then the value of $QP_{adapt}$ is further increased.

At 650, $QP_{final}$ may be calculated as the sum $$QP_{final} = QP_{adapt} + QP_{control}(\text{frame type}, QP_{adapt}).$$

The last term, $QP_{control}$ (frame type, $QP_{adapt}$), may have the same properties as discussed in the case of AVC encoded frames. Specifically, this value may be a relatively small value, e.g., between −1 and +1, that may be added to $QP_{adapt}$ if the frame is a reference frame. This serves to make the weight of a reference frame greater with respect to non-reference frames. As in the case of the embodiment of FIG. 2, higher values for $QP_{control}$ (frame type, $QP_{adapt}$) may be used for higher bit rates. The appropriate value for $QP_{control}$ (frame type, $QP_{adapt}$) may be decided empirically in an embodiment.

Figure 7:
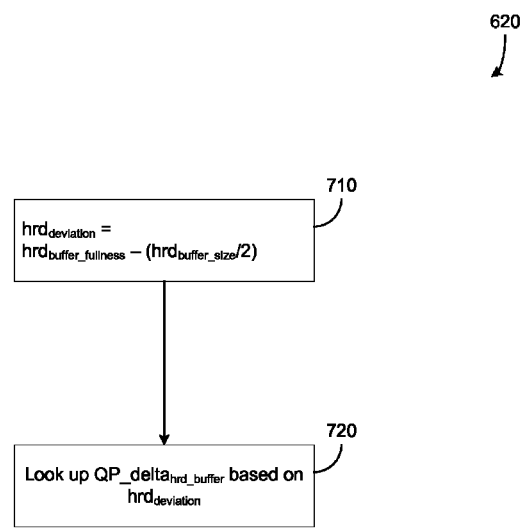
FIG. 7 is a flowchart illustrating the determination of QP_delta$_{hrd\_buffer}$, according to an embodiment.

FIG. 7 illustrates the determination of $QP\_delta_{hrd\_buffer}(QP_{init})$ (620 of FIG. 6) in greater detail, according to an embodiment. At 710, a value $hrd_{deviation}$ may be determined by the calculation $$hrd_{deviation} = hrd_{buffer\_fullness} - (hrd_{buffer\_size}/2).$$

At 720, the value $hrd_{deviation}$ may be used to access a lookup table. Using this value, a corresponding value for $QP\_delta_{hrd\_buffer}(QP_{init})$ may be determined. The lookup table may be derived empirically in an embodiment, and may depend on the system in which this process is used, and the configuration of this system.

Figure 8:
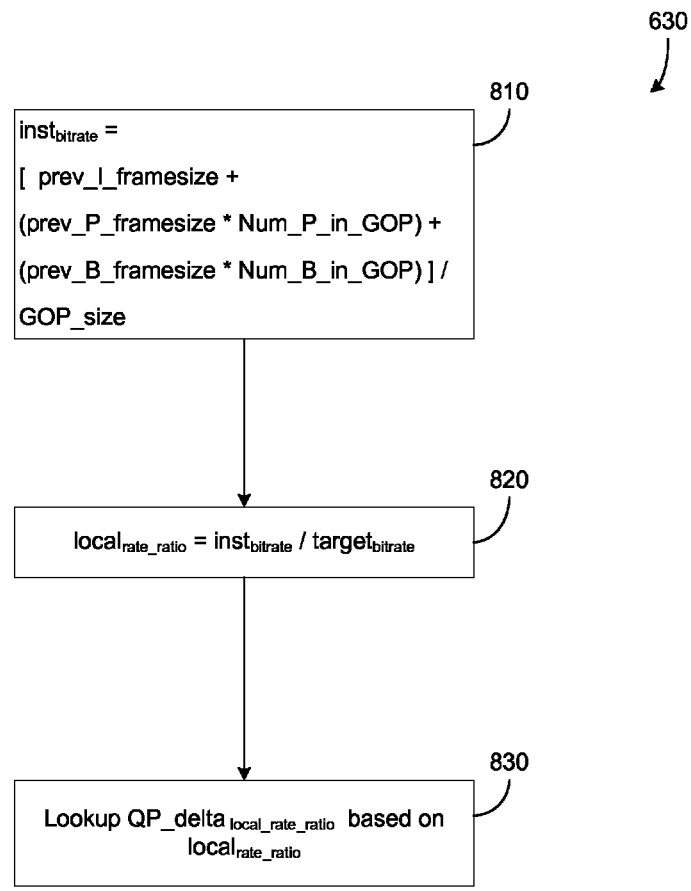
FIG. 8 is a flowchart illustrating the determination of QP_delta$_{local\_rate\_ratio}$, according to an embodiment.

FIG. 8 illustrates the determination of $QP\_delta_{local\_rate\_ratio}(QP_{init})$ (630 of FIG. 6) according to an embodiment. At 810, an instant bit rate $inst_{bitrate}$ may be determined according to the calculation $$inst_{bitrate} = [prev\_I\_framesize + (prev\_P\_framesize * Num\_P\_in\_GOP) + (prev\_B\_framesize * Num\_B\_in\_GOP)] / GOP\_size.$$

As in the case of 410 of FIG. 4, prev_I_framesize refers to the size of the previous I frame, prev_B_framesize refers to the size of the previous B frame, and prev_P_framesize refers to the size of the previous P frame. GOP refers to a group of pictures between two I frames. Num_P_in_GOP refers to the number of P frames in the GOP, while Num_B_in_GOP refers to the number of B frames in the GOP. GOP_size refers to the number of frames in the GOP.

At 820, the local rate ratio may be determined according to a calculation $$local_{rate\_ratio} = inst_{bitrate} / target_{bitrate}$$

as in 420 of FIG. 4.

At 830, a look up table may be used to determine a value for $QP\_delta_{local\_rate\_ratio}$ base on the calculated value $local_{rate\_ratio}$. The lookup table may be derived empirically in an embodiment, and may depend on the system in which this process is used, and the particular configuration of this system.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a non-transitory computer readable medium having computer program logic stored therein to cause a computer system to perform one or more features and/or combinations of features disclosed herein.

Figure 9:
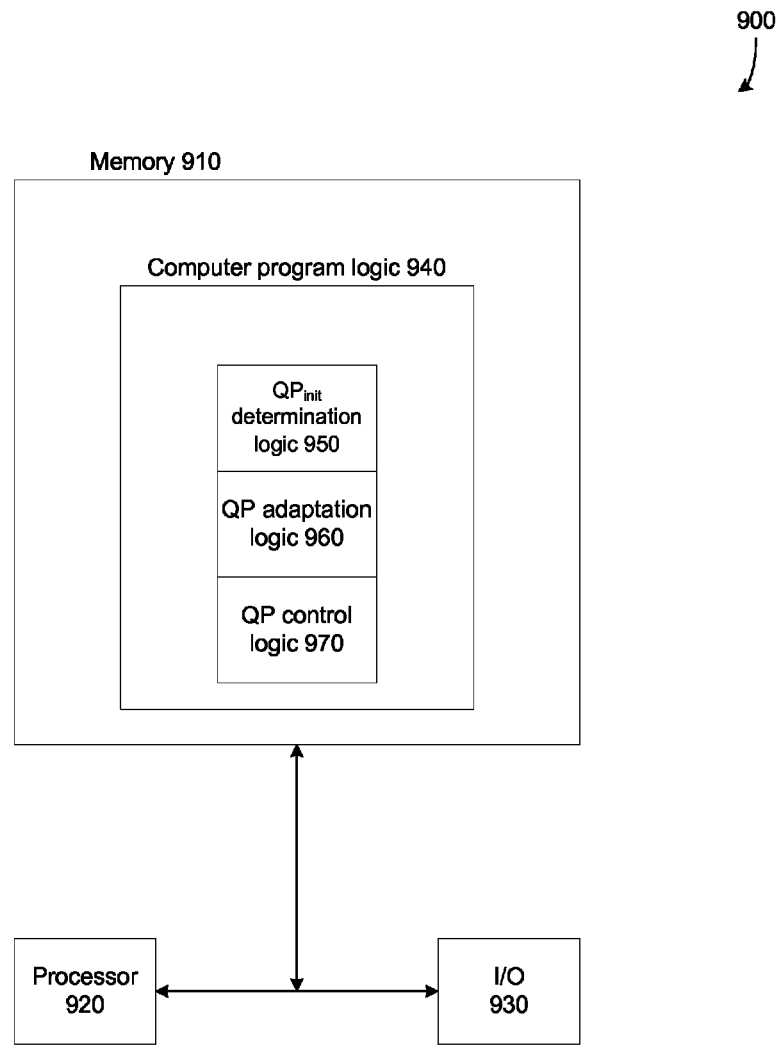
FIG. 9 is a block diagram illustrating the implementation of a software or firmware embodiment.

A software or firmware embodiment of the processing described herein is illustrated in FIG. 9. In this figure, system 900 may include a processor 920 and a body of memory 910 that may include one or more computer readable media that may store computer program logic 940. Memory 910 may be implemented as a hard disk and drive, a removable media such as a compact disk, a read-only memory (ROM) or random access memory (RAM) device, for example, or some combination thereof. Processor 920 and memory 910 may be in communication using any of several technologies known to one of ordinary skill in the art, such as a bus. Computer program logic 940 contained in memory 910 may be read and executed by processor 920. One or more I/O ports and/or I/O devices, shown collectively as I/O 930, may also be connected to processor 920 and memory 910.

Computer program logic 940 may include $QP_{init}$ determination logic 950. This logic may be responsible for performing the processing illustrated in references 110, 210, and 610 of FIGS. 1, 2, and 6 respectively. Logic 950 may therefore include, for example, logic for the computation of $QP_{init}$ based at least in part on one or more QP values from previous frames.

Computer program logic 940 may also comprise QP adaptation logic 960. Logic 560 may be responsible for calculating $QP_{adapt}$ as discussed above with respect to reference 220-250 in FIG. 2, and reference 620-640 of FIG. 6, for example. Logic 960 may therefore include logic for adapting the value $QP_{init}$ on the basis of HRD buffer fullness and on local and/or global rate ratios.

Computer program logic 940 may also comprise QP control logic 970. Logic 970 may be responsible for performing the processing discussed above with respect to references 260-270 of FIG. 2 and reference 650 of FIG. 6, for example. Logic 970 may therefore include logic for calculating the final value of the QP by adding a control value $QP_{control}$ based at least in part on the frame type, and in the case of AVC encoded frames, performing a clipping process.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
in a video compression process, performing bit rate control by determining an initial quantization parameter $QP_{init}$ for a frame based on the type of frame and a quantization parameter $QP_{previous}$ of frame a previous frame of the same type;
adapting $QP_{init}$ to form an adapted quantization parameter $QP_{adapt}$ based on fullness of a hypothetical reference decoder (HRD) buffer, and on a local rate ratio of an instant bit rate to a target bit rate;
controlling $QP_{adapt}$ to form a final quantization parameter OP final based on the type of frame; and
compressing the frame using $QP_{final}$,
wherein the frame is encoded according to the MPEG2 standard, and said determining of $QP_{init}$ comprises:

$$\text{calculating } QP_{init} = \text{alpha} * QP_{previous\_I\_frame} + \text{beta} * QP_{previous\_P\_frame} + \text{gamma} * QP_{previous\_B\_frame}$$

where alpha+beta+gamma=1, where each $\geq 0$,
$QP_{previous\_I\_frame}$ is the quantization parameter of most recent I frame,
$QP_{previous\_P\_frame}$ is the quantization parameter of the most recent P frame, and
$QP_{previous\_B\_frame}$ is the quantization parameter of the most recent B frame.

2. The method of claim 1, wherein said adapting of $QP_{init}$ comprises:
calculating $QP_{adapt} = QP_{init} + QP\_delta_{hrd\_buffer}(QP_{init}) + QP\_delta_{local\_rate\_ratio}(QP_{init})$
where
$QP\_delta_{hrd\_buffer}(QP_{init})$ is a value dependent on the fullness of the HRD buffer, and
$QP\_delta_{local\_rate\_ratio}(QP_{init})$ is a value dependent on the local rate ratio.

3. The method of claim 1, wherein said controlling of $QP_{adapt}$ adapt comprises:
calculating $QP_{final} = QP_{adapt} + QP_{control}(\text{frame type}, QP_{adapt})$
where $QP_{control}$ is dependent on the frame type and on $QP_{adapt}$.

4. A system, comprising:
a processor; and
a memory in communication with said processor, said memory for storing a plurality of processing instructions for directing said processor to:
  perform bit rate control by determining an initial quantization parameter $QP_{init}$ for a frame based on the type of frame and a quantization parameter $QP_{previous}$ of a previous frame of the same type; previous of
  adapt $QP_{init}$ to form an adapted quantization parameter $QP_{adapt}$ based on fullness of a hypothetical reference decoder (HRD) buffer, and on a local rate ratio of an instant bit rate to a target bit rate;
  control $QP_{adapt}$ to form a final quantization parameter $QP_{final}$ based on the type of frame; and
  compress the frame using $QP_{final}$,
wherein the frame is encoded according to the MPEG2 standard, and said determining of $QP_{init}$ comprises:

calculating $QP_{init}$ = alpha $* QP_{previous\_I\_frame}$ + beta $* QP_{previous\_P\_frame}$ + gamma $* QP_{previous\_B\_frame}$ where alpha+beta+gamma=1, where each $\geq 0$,
$QP_{previous\_I\_frame}$ is the quantization parameter of most recent I frame,
$QP_{previous\_P\_frame}$ is the quantization parameter of the most recent P frame, and
$QP_{previous\_B\_frame}$ is the quantization parameter of the most recent B frame.

5. The system of claim 4, wherein said adapting of $QP_{init}$ comprises:
  calculating $QP_{adapt}=QP_{init}+QP\_delta_{hrd\_buffer}(QP_{init})+QP\_delta_{local\_rate\_ratio}(QP_{init})$
  where
  $QP\_delta_{hrd\_buffer}(QP_{init})$ is a value dependent on the fullness of the HRD buffer, and
  $QP\_delta_{local\_rate\_ratio}(QP_{init})$ is a value dependent on the local rate ratio.

6. The system of claim 4, wherein said controlling of $QP_{adapt}$ comprises:
  calculating $QP_{final}=QP_{adapt}+QP_{control}$(frame type, $QP_{adapt}$)
  where $QP_{control}$ is dependent on the frame type and on $QP_{adapt}$.

7. A computer program product comprising a non-transitory computer useable medium having control logic stored therein, the computer control logic comprising:
  logic configured to cause a processor to perform bit rate control by determining an initial quantization parameter $QP_{init}$ for a frame based on the type of frame and a quantization parameter $QP_{previous}$ of a previous frame of the same type;
  logic configured to cause a processor to adapt $QP_{init}$ to form an adapted quantization parameter $QP_{adapt}$ based on fullness of a hypothetical reference decoder (HRD) buffer, and on a local rate ratio of an instant bit rate to a target bit rate;
  logic configured to cause a processor to control $QP_{adapt}$ to form a final quantization parameter $QP_{final}$ based on the type of frame; and
  logic configured to cause a processor to compress the frame using $QP_{final}$, wherein the frame is encoded according to the MPEG2 standard, and the determining of $QP_{init}$ comprises:

calculating $QP_{init}$ = alpha $* QP_{previous\_I\_frame}$ + beta $* QP_{previous\_P\_frame}$ + gamma $* QP_{previous\_B\_frame}$ where alpha+beta+gamma=1, where each $\geq 0$,
$QP_{previous\_I\_frame}$ is the quantization parameter of most recent I frame,
$QP_{previous\_P\_frame}$ is the quantization parameter of the most recent P frame, and
$QP_{previous\_B\_frame}$ is the quantization parameter of the most recent B frame.

8. The computer program product of claim 7, wherein the adapting of $QP_{init}$ comprises:
  calculating $QP_{adapt}=QP_{init}+QP\_delta_{hrd\_buffer}(QP_{init})+QP\_delta_{local\_rate\_ratio}(QP_{init})$
  where
  $QP\_delta_{hrd\_buffer}(QP_{init})$ is a value dependent on the fullness of the HRD buffer, and
  $QP\_delta_{local\_rate\_ratio}(QP_{init})$ is a value dependent on the local rate ratio.

* * * * *